(12) United States Patent
Shimada

(10) Patent No.: US 7,847,540 B2
(45) Date of Patent: Dec. 7, 2010

(54) CONTACTLESS ROTATION ANGLE SENSOR

(75) Inventor: Hiroyuki Shimada, Tokyo (JP)

(73) Assignee: Niles Co., Ltd., Tokyo (JP)

( * ) Notice: Subject to any disclaimer, the term of this patent is extended or adjusted under 35 U.S.C. 154(b) by 243 days.

(21) Appl. No.: 12/285,040

(22) Filed: Sep. 29, 2008

(65) Prior Publication Data

US 2009/0091317 A1    Apr. 9, 2009

(30) Foreign Application Priority Data

Oct. 3, 2007    (JP) .............................. 2007-259924

(51) Int. Cl.
*G01B 7/30* (2006.01)
(52) U.S. Cl. ................................. 324/207.25
(58) Field of Classification Search ............. 324/207.25
See application file for complete search history.

(56) References Cited

U.S. PATENT DOCUMENTS 6,809,513 B2 * 10/2004 Terui et al. ............. 324/207.25

FOREIGN PATENT DOCUMENTS

JP    2003-269992    9/2003

\* cited by examiner

*Primary Examiner*—Reena Aurora
(74) *Attorney, Agent, or Firm*—Rader, Fishman & Grauer PLLC

(57) ABSTRACT

There is provided a rotation angle sensor which does not require resin and an O ring for sealing and is applicable to such a structure that a rotating body to be detected passes through a center portion. A waterproof surface on the main body side 39 positioned at the inner periphery of the circuit-board arrangement portion 27 and rising toward the cover 17 is circumferentially provided at the inner periphery of the housing main body 15, the waterproof surface on the main body side 39 opposes the outer periphery of the detection shank 3 through a space across from the upper to the lower portion of the housing main body 15, a waterproof surface on the cover side 43 disposed opposite to the upper inner periphery of the waterproof surface on the main body side 39 is circumferentially provided at the lower surface of the cover 17 and a ditch D passing between the upper and the lower portion of the housing 5 is formed of the space between the detection shank 3 and the housing 5 and between the detection shank 3 and the waterproof surface on the main body side 39.

5 Claims, 4 Drawing Sheets

CONTACTLESS ROTATION ANGLE SENSOR

BACKGROUND OF THE INVENTION

1. Field of the Invention

The present invention relates to a contactless rotation angle sensor serving to detect the rotation angle of various apparatus or the rotation amount of a rotating body to be detected moving with a gearshift operation of an automatic transmission.

2. Description of the Related Art

There has been known a contactless rotation angle sensor described in Japanese Patent Application Laid-Open No. 2003-269992 as a conventional one. The structure of the contactless rotation angle sensor is such that the inside of a case is separated into two spaces by a partition to store a rotation mechanism section in the one space and an electric circuit section in the other. The one space of the case storing the electric circuit section is closed by a second lid and a space between the case and the second lid is sealed with a small amount of resin and an O ring.

For this reason, the electric circuit section stored in the other space of the case can be sealed by the second lid and the O ring.

Such a structure, however, has a problem in that water is prone to be accumulated in the one space of the case storing the rotation mechanism section and the accumulated water evaporates to expose the electric circuit section to moisture, degrading durability and a detecting accuracy. The structure has another problem in that it requires sealing resin and an O ring and cannot be applied to such a structure that a detected rotating body passes through the center of the case.

Japanese Patent Application Laid-Open No. 2003-269992

There have be solved such problems that water is prone to be accumulated in the one space of the case storing the rotation mechanism section to degrade durability and a detecting accuracy, and the structure requires sealing resin and an O ring and cannot be applied to such a structure that a rotating body to be detected passes through the center.

SUMMARY OF THE INVENTION

According to the present invention, a contactless rotation angle sensor has a structure that hardly accumulates water inside to maintain durability and a detecting accuracy, does not require resin and an O ring for sealing and is applicable to such a structure that a rotating body to be detected passes through a center portion. For this reason, the contactless rotation angle sensor according to the present invention is characterized by including: a detection shank which is provided with a magnetism generation body at its outer periphery, coupled to a rotating body to be detected and integrally rotates therewith; and a housing which is formed of an insulating housing main body concentrically arranged around the detection shank and a cover for covering the upper portion of the housing main body and serves as a fixing side with a space left between the housing and detection shank; the contactless rotation angle sensor storing a circuit board at a circuit-board arrangement portion formed at the upper portion of the housing main body and covered with the cover and holding in the housing main body a detection body detecting a magnetism generation body in a contactless manner and outputting a detected signal to the circuit board, wherein a water proof surface on the main body side positioned at the inner periphery of the circuit-board arrangement portion and rising toward the cover is circumferentially provided at the inner periphery of the housing main body, the waterproof surface on the main body side opposes the outer periphery of the detection shank through a space across from the upper to the lower portion of the housing main body, a waterproof surface on the cover side disposed opposite to the upper inner periphery of the waterproof surface on the main body side is circumferentially provided at the lower surface of the cover and a ditch passing between the upper and the lower portion of the housing is formed of the space between the detection shank and the housing and between the detection shank and the waterproof surface on the main body side.

According to the present invention, a contactless rotation angle sensor includes: a detection shank which is provided with a magnetism generation body at its outer periphery, coupled to a rotating body to be detected and integrally rotates therewith; and a housing which is formed of an insulating housing main body concentrically arranged around the detection shank and a cover for covering the upper portion of the housing main body and serves as a fixing side with a space left between the housing and detection shank; the contactless rotation angle sensor storing a circuit board at a circuit-board arrangement portion formed at the upper portion of the housing main body and covered with the cover and holding in the housing main body a detection body detecting a magnetism generation body in a contactless manner and outputting a detected signal to the circuit board, wherein a waterproof surface on the main body side positioned at the inner periphery of the circuit-board arrangement portion and rising toward the cover is circumferentially provided at the inner periphery of the housing main body, the waterproof surface on the main body side opposes the outer periphery of the detection shank through a space across from the upper to the lower portion of the housing main body, a waterproof surface on the cover side disposed opposite to the upper inner periphery of the waterproof surface on the main body side is circumferentially provided at the lower surface of the cover and a ditch passing between the upper and the lower portion of the housing is formed of the space between the detection shank and the housing and between the detection shank and the waterproof surface on the main body side.

The waterproof surface on the main body side and the waterproof surface on the cover side disposed opposite to each other prevent water entering the space between the detection shank and the cover from reaching the circuit-board arrangement portion of the circuit board and the water entering the space passes along the ditch passing between the upper and the lower portion of the housing and is drained off, which enables water to be hardly accumulated inside.

The contactless rotation angle sensor does not require resin and an O ring for sealing and is applicable to such a structure that a rotating body to be detected passes through the center portion of the housing.

The waterproof surface on the main body side is disposed opposite to the waterproof surface on the cover side to realize the contactless rotation angle sensor which has a structure that hardly accumulates water inside to maintain durability and a detecting accuracy, does not require resin and an O ring for sealing and is applicable to such a structure that a rotating body to be detected passes through a center portion.

DESCRIPTION OF SYMBOLS

Figure 1:
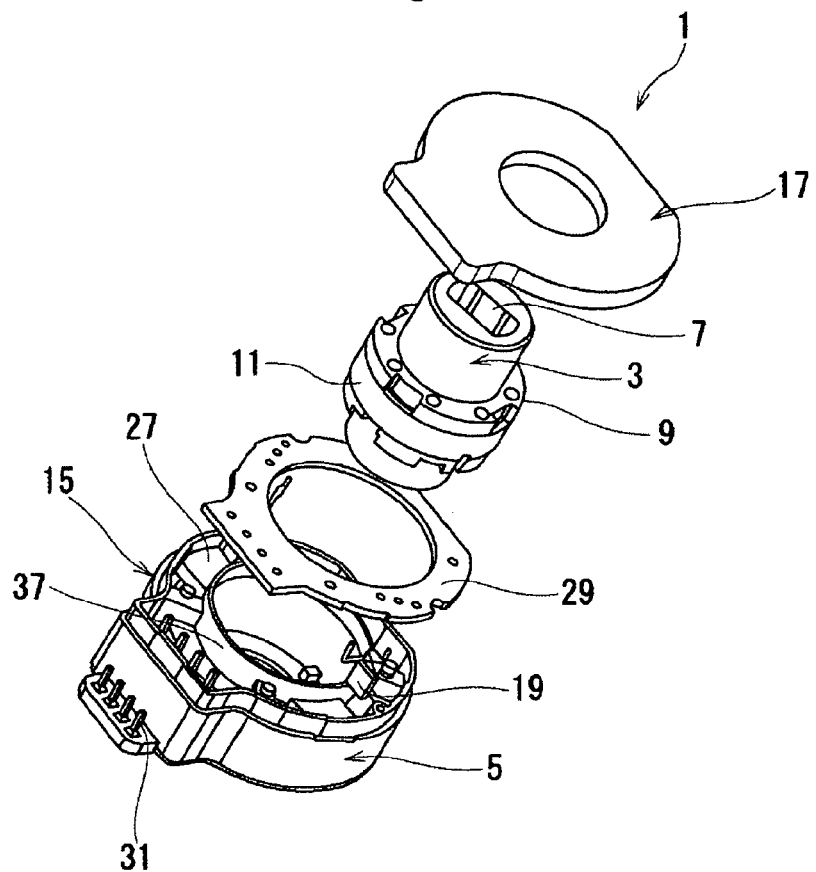
FIG. 1 is an exploded perspective view of a contactless rotation angle sensor (first embodiment)

1 & 1A Contactless rotation angle sensor
3 Detection shank
5 Housing
9 Large-diameter portion (outer periphery of the detection shank)
11 Magnet (magnetism generation body)
13 Rotating body to be detected
15 & 15A Housing main body
17 Cover
19 Magnetoelectric transducer
21 Fixing side
27 Circuit-board arrangement portion
26 & 48 Circulation port
29 Circuit board
39 & 39A Waterproof surface on the main body side
43 Waterproof surface on the cover side
D Ditch

DETAILED DESCRIPTION OF THE PREFERRED EMBODIMENTS

First Embodiment

Figure 2:
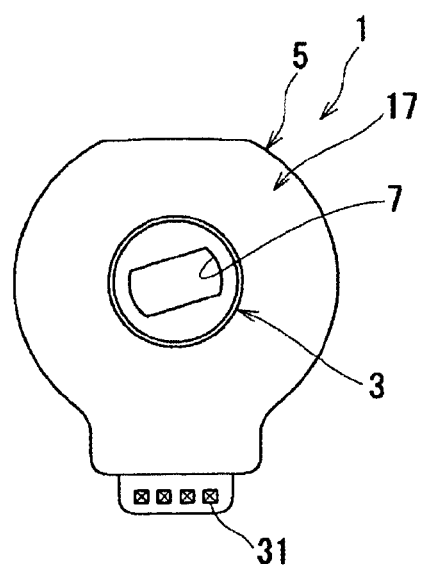
FIG. 2 is a bottom view of the contactless rotation angle sensor (first embodiment)
Figure 3:
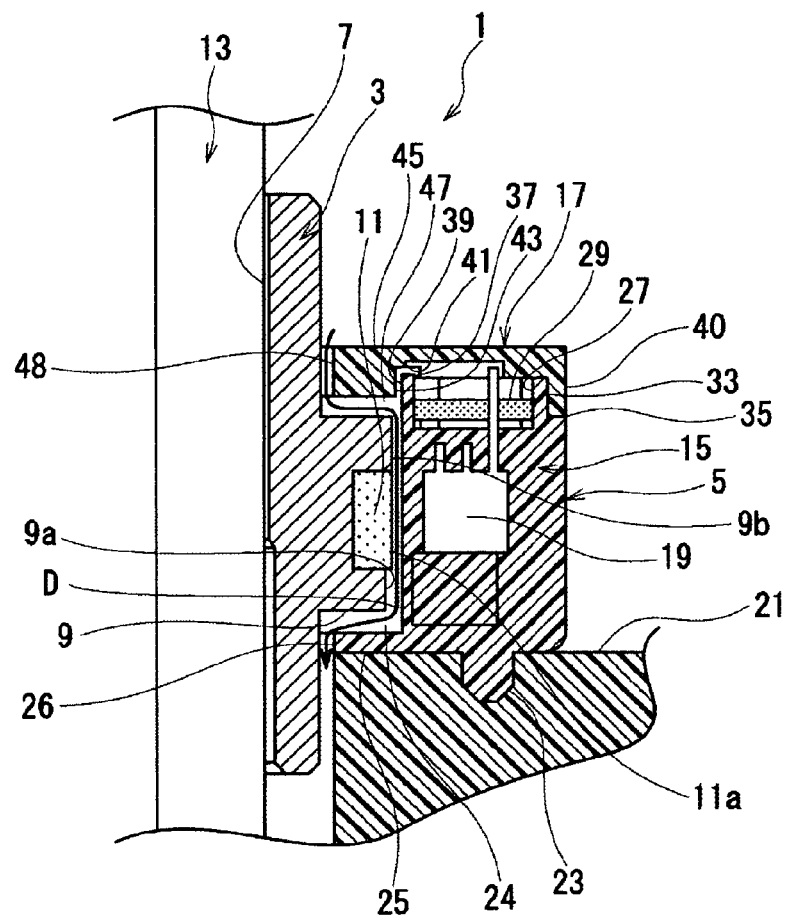
FIG. 3 is a schematic half cross section of the contactless rotation angle sensor (first embodiment)
Figure 4:
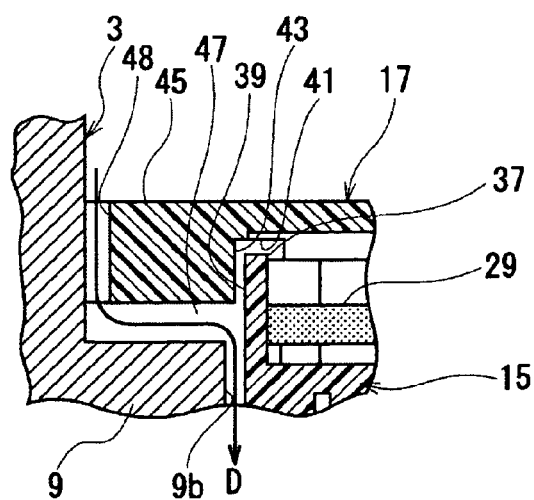
FIG. 4 is an expanded cross section illustrating principal elements in the vicinity of a ditch (first embodiment)

FIG. is an exploded perspective view of a contactless rotation angle sensor according to a first embodiment of the present invention. FIG. 2 is a top view of the contactless rotation angle sensor. FIG. 3 is a schematic half cross section of the contactless rotation angle sensor. FIG. 4 is an expanded cross section illustrating principal elements in the vicinity of a ditch.

As illustrated in FIGS. 1 to 3, a contactless rotation angle sensor 1 serves to detect the rotation amount of a rotating body to be detected moving with a gearshift operation of an automatic transmission of an automobile and includes a detection shank 3 and a housing 5.

The detection shank 3 is formed in a hollow shape and has a fitting long hole 7 with two parallel faces at a shaft center portion and a large-diameter portion 9 at a middle peripheral portion thereof. A magnet 11 as a magnetism generation body is attached to the large-diameter portion 9. The large-diameter portion 9 is formed such that the outer peripheral surface 9a thereof below the magnet 11 is smaller in diameter than the peripheral surface 11a of the magnet 11 and the peripheral surface 9b thereof above the magnet 11 is equal in diameter to the peripheral surface 11a of the magnet 11.

The magnet 11 uses a plastic magnet formed of resin and metal powder to prevent rust. The magnet 11 is fitted into the large-diameter portion 9 by pressure, adhesion and integral molding. The fitting hole 7 is coupled to a rotating body to be detected 13 rotating according to the gear shifting amount of the automatic transmission. The detection shank 3 rotates integrally with the rotating body to be detected 13.

The housing 5 is disposed concentrically around the detection shank 3 and formed of a housing main body 15 and a cover 17.

The housing main body 15 is formed of resin and insulated. A magnetoelectric transducer 19 such as Hall element and Hall IC as a detection body is fixed to the housing main body 15. The magnetoelectric transducer 19 detects the magnet 11 in a contactless manner, converts magnetic force into electric force such as voltage and outputs it to a circuit board 29.

The housing main body 15 is fixed to and supported by a fixing side 21 and provided with a projection 23, which is fitted into the fixing side 21 and performs detent and a relative positioning with the rotating body to be detected 13, on the bottom face thereof. Incidentally, the fixing side 21 is a supporting portion for a sensor on the side of a car body, a supporting portion for a manual shaft, a supporting portion for a circuit board and a connector and formed of die casting, for example.

The inner periphery of bottom portion of the housing main body 15 has a flange 25 opposing the lower side of the large-diameter portion 9 of the detection shank 3 through a space 24. A space is created between the flange portion 25 and the outer periphery of the detection shank 3 and serves as a circulation port 26 capable of circulating such fluid as water and pollutant gas. The circulation port 26 communicates with space 24.

A circuit-board arrangement portion 27 in a recess shape is circumferentially formed on the upper portion of the housing main body 15 and the circuit board 29 is attached to the circuit-board arrangement portion 27. The magnetoelectric transducer 19 is conductively connected to the circuit board 29. An external terminal 31 conductively connected to the circuit board 29 is provided on the outside of the housing main body 15 and can be connected to external apparatus.

A fitting holding wall portion 33 is provided on the upper portion of the housing main body 15. A fitting stepped portion 35 for holding the cover 17 is formed on the external portion of the fitting holding wall portion 33.

As illustrated in FIGS. 3 and 4, a waterproof wall 37 is positioned on the inner periphery side of the circuit-board arrangement portion 27 and circumferentially provided thereon. The waterproof wall 37 is integrally formed with the housing main body 15 and rises toward the cover 17.

The inner periphery of the housing main body 15 and the waterproof wall 37 is a continuously circumferential waterproof surface on the main body side 39. Around the inner periphery of the waterproof wall 37, the waterproof surface on the main body side 39 is positioned on the inner periphery side of the circuit-board arrangement portion 27 of the circuit board 29 and rises toward the cover 17. Around the inner periphery of the housing main body 15, the waterproof surface on the main body side 39 opposes the large-diameter portion 9 being the outer periphery of the detection shank 3 through a space, extends from the upper to the lower portion of the housing main body 15 and reaches the flange portion 25.

In the present embodiment, the cover 17 is formed of resin, insulated and attached to the housing main body 15 to cover the upper side of the circuit-board arrangement portion 27. A fitting wall portion 40 is formed around the outer periphery of the cover 17 and fitted to the outside of the fitting holding wall portion 33 of the housing main body 15. The fitting wall portion 40 is caused to abut on the stepped portion 35. The outer periphery of the cover 17 is flush with that of the housing main body 15. A space between the fitting holding wall portion 33 and the fitting wall portion 40 can be hermetically fixed by adhesion and deposition.

A downward ditch 41 is circumferentially formed on the lower face of the middle portion in the radial direction of the cover 17. The waterproof wall 37 is fitted into and disposed at the ditch 41. A waterproof surface on the cover side 43 toward the outside in the radial direction is circumferentially formed in the ditch and opposes the upper inner periphery of the waterproof surface on the main body side 39.

An inner periphery portion 45 of the cover 17 symmetrically opposes the flange portion 25 over the large-diameter portion 9 of the detection shank 3 through a space 47.

A space is created between the inner periphery portion 45 of the cover 17 and the outer peripheral of the detection shank 3 and serves as a circulation port 48 capable of circulating such fluid as water and pollutant gas. The circulation port 48 communicates with the space 47.

The dimension in the radial direction of the circulation port 48 is set to be larger than the space between the waterproof surface on the main body side 39 and the waterproof surface on the cover side 43. The dimension in the radial direction of the circulation port 26 and the dimension between the large-diameter portion 9 of the detection shank 3 and the waterproof surface on the main body side 39 are also set to be larger than the space between the waterproof surface on the main body side 39 and the waterproof surface on the cover side 43.

Thus, a ditch D passing between the upper and the lower portion of the housing 5 is formed of the circulation ports 48 and 26 being the space between the detection shank 3 and the housing 5, the spaces 47 and 24 and the space between the large-diameter portion 9 of the detection shank 3 and the waterproof surface on the main body side 39.

Incidentally, in the present embodiment, although the circulation ports 48 and 26 use the spaces between the cover 17 and the detection shank 3 and between the flange portion 25 of the housing main body 15 and the detection shank 3 respectively, a special circulation port different from the foregoing spaces in shape and size may be provided.

[Detection of Rotation Angle]

The rotation of the rotating body to be detected 13 according to the gearshift operation of an automatic transmission integrally rotates the detection shank 3. The rotation causes the magnet 11 to relatively rotate with respect to the magnetoelectric transducer 19 to vary voltage converted by the magnetoelectric transducer 19.

Variation in the voltage is outputted to a circuit board 29 and a gear shift position of an automatic transmission is detected by detecting a rotation angle.

[Waterproof]

The contactless rotation angle sensor 1 according to the present embodiment of the present invention includes the ditch D which is formed as described above and passes between the upper and the lower portion of the housing 5.

As indicated by arrows in FIGS. 3 and 4, if water enters the circulation port 48 between the detection shank 3 and the cover 17, the water reaches the space 47 of the ditch D. The water reaching the space 47 moves to the outer peripheral side of the large-diameter portion 9.

On the outer peripheral side of the large-diameter portion 9, the waterproof surface on the main body side 39 is disposed opposite and close to the waterproof surface on the cover side 43 at the upper portion of the space 47 to prevent the water from reaching from the outer peripheral side of the large-diameter portion 9 to the circuit-board arrangement portion 27.

For this reason, the water reaching the outer peripheral side of the large-diameter portion 9 flows downward between the large-diameter portion 9 of the detection shank 3 and the waterproof surface on the main body side 39 along the waterproof surface on the main body side 39 and reaches the upper portion of the flange portion 25.

In this case, the distance between the outer peripheral surface 9a below the magnet 11 in the large-diameter portion 9 and the waterproof surface on the main body side 39 is larger than the distance between the magnet 11 and the waterproof surface on the main body side 39, decreasing a ditch resistance and accelerating the fall of the water.

The water reaching the upper potion of the flange portion 25 passes along the space 24 between the flange portion 25 and the large-diameter portion 9 and is drained from the circulation port 26 between the detection shank 3 and the flange portion 25 on the lower portion of the housing main body 15, as indicated by the arrow.

Thus, the water entering the housing 5 can be drained outside through the ditch D passing between the upper and the lower portion of the housing 5.

In particular, the dimensions in the radial direction of the circulation ports 48 and 26 and the dimension between the large-diameter portion 9 of the detection shank 3 and the waterproof surface on the main body side 39 are set to be larger than the space between the waterproof surface on the main body side 39 and the waterproof surface on the cover side 43, so that the ditch resistance of the circulation ports 48 and 26 and the ditch resistance between the large-diameter portion 9 of the detection shank 3 and the waterproof surface on the main body side 39 are smaller than a ditch resistance between the waterproof surface on the main body side 39 and the waterproof surface on the cover side 43, thereby surely draining the water entering and suppressing the water from moving to the circuit board 29.

Even if the water enter the circulation port 26, it is drained with elapse of time.

Even if pollutant gas enters the space between the detection shank 3 and the housing 5 through the circulation ports 48 and 26, it is drained outside in the same manner.

Effect of First Embodiment

According to the first embodiment of the present invention, a contactless rotation angle sensor includes: a detection shank 3 which is provided with a magnet 11 as a magnetism generation body at its outer periphery, coupled to a rotating body to be detected 13 and integrally rotates therewith; and a housing 5 which is formed of an insulating housing main body 15 concentrically arranged around the detection shank 3 and a cover 17 for covering the upper portion of the housing main body 15 and serves as a fixing side with a space left between the housing and detection shank 3; the contactless rotation angle sensor storing a circuit board 29 at a circuit-board arrangement portion 27 formed at the upper portion of the housing main body 15 and covered with the cover 17 and holding in the housing main body 15 a magnetoelectric transducer 19 as a detection body detecting the magnet 11 in a contactless manner and outputting a detected signal to the circuit board 29, wherein a waterproof surface on the main body side 39 positioned at the inner periphery of the circuit-board arrangement portion 27 and rising toward the cover 17 is circumferentially provided at the inner periphery of the housing main body 15, the waterproof surface on the main body side 39 opposes the outer periphery of the detection shank 3 through a space across from the upper to the lower portion of the housing main body 15, a waterproof surface on the cover side 43 disposed opposite to the upper inner periphery of the waterproof surface on the main body side 39 is circumferentially provided at the lower surface of the cover 17 and a ditch D passing between the upper and the lower portion of the housing 5 is formed of the space between the detection shank 3 and the housing 5 and between the detection shank 3 and the waterproof surface on the main body side 39.

Accordingly, the waterproof surface on the main body side 39 and the waterproof surface on the cover side 43 disposed opposite to each other prevent the water entering the space between the detection shank 3 and the cover 17 from reaching the circuit-board arrangement portion 27 of the circuit board 29 and the water entering the space passes along the ditch D passing between the upper and the lower portion of the housing 5 and is drained off.

For this reason, the water entering the space between the detection shank 3 and the housing 5 is hardly accumulated to suppress the circuit board 29 from being soaked in the water and exposed to moisture due to the evaporation of the water and to pollutant gas. Thus, the circuit board 29 is suppressed from being oxidized and deteriorated, thereby maintaining a detection accuracy and increasing durability.

As described above, the water entering the space hardly remains between the detection shank 3 and the housing 5, and dew hardly condenses inside even if the circuit board 29 is heated to cause difference in temperature. Also, in this respect, the circuit board 29 is suppressed from being oxidized and deteriorated, thereby maintaining a detection accuracy and increasing durability.

Furthermore, the rotation angle sensor according to the first embodiment does not require resin and an O ring for sealing and is applicable to such a structure that the rotating body to be detected 13 passes through the center of the housing 5.

The rotation angle sensor has such a contactless structure that a slidingly contacting seal member such as an O ring is not interposed between the detection shank 3 and the housing 5, preventing the detection shank 3 from being mechanically worn to reduce a rotation working torque and improve accuracy in the detection of a rotation angle.

The waterproof surface on the main body side 39 is formed across the inner periphery of the waterproof wall 37 rising and integrally formed on the housing 15 and the housing 15.

For this reason, the number of components is decreased to facilitate assembling and component management.

Second Embodiment

Figure 5:
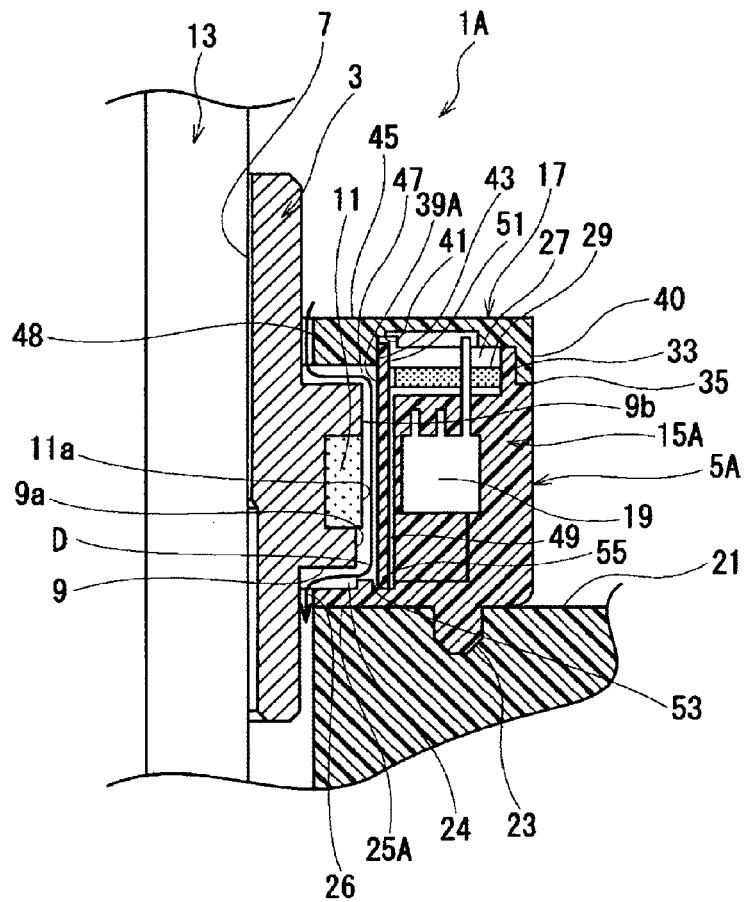
FIG. 5 is a schematic half cross section of a contactless rotation angle sensor (second embodiment)
Figure 6:
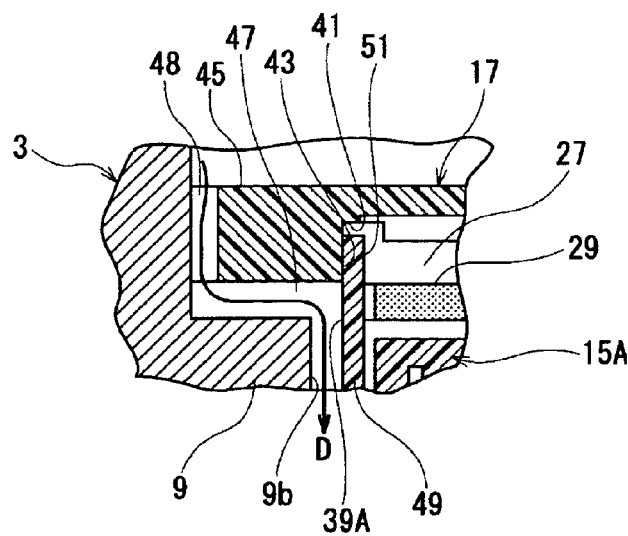
FIG. 6 is an expanded cross section illustrating principal elements in the vicinity of the ditch (second embodiment)
Figure 7:
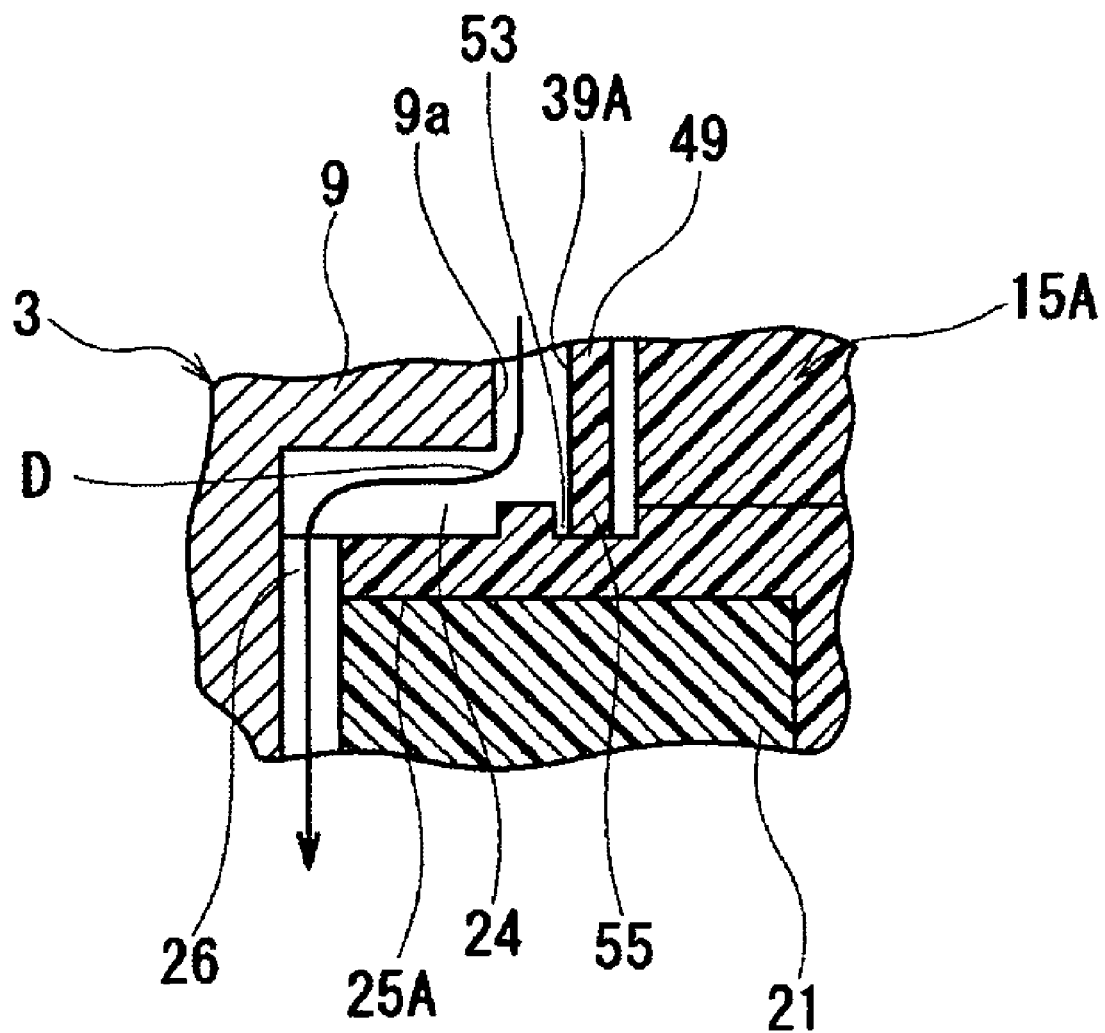
FIG. 7 is an expanded cross section illustrating principal elements in the vicinity of the ditch (second embodiment).

FIGS. 5 to 7 relate to the second embodiment of the present invention. FIG. 5 is a schematic half cross section of a contactless rotation angle sensor. FIG. 6 is an expanded cross section illustrating principal elements in the vicinity of a ditch. FIG. 7 is an expanded cross section illustrating principal elements in the vicinity of a ditch. The second embodiment is basically the same in configuration as the first embodiment. The components that are the same as those in the first embodiment and correspond thereto are given the same reference numerals and characters or provided with a suffix "A" and principal elements are described. Duplicated description is omitted.

The structure of a contactless rotation angle sensor 1A is such that a waterproof surface on the main body side 39A is formed on the outer periphery of a circular tube body 49 of metal or resin separately assembled to a housing main body 15A. The circular tube body 49 is provided on the inner periphery of the housing main body 15A across from the upper to the lower portion thereof.

As illustrated in FIGS. 5 and 6, the waterproof surface on the cover side 43 is formed at the ditch 41 of the cover 17 as is the case with the first embodiment. The upper end portion 51 of the circular tube body 49 is fitted to and disposed in the ditch 41 with a space left in the radial direction. The waterproof surface on the main body side 39A at the upper end portion 51 of the circular tube body 49 abuts on the waterproof surface on the cover side 43 to leave no space therebetween. However, the waterproof surface on the main body side 39A may be disposed opposite and close to the waterproof surface on the cover side 43 through a space.

As illustrated in FIGS. 5 and 7, an upward ditch 53 is circumferentially provided at the lower portion of the housing main body 15A. The lower end portion 55 of the circular tube body 49 is disposed in the ditch 53 with a space left in the radial direction. The lower end of the circular tube body 49 is fitted to and brought into close contact with the ditch 53 to regulate movement not less than a certain level in the radial direction. The regulation prevents the circular tube body 49 from touching the magnet 11.

A flange portion 25A of the housing main body 15A is formed lower than the upper end of the ditch 53 to cause the water moving from the upper portion to easily move toward the flange portion 25A.

The circular tube body 49 is separately assembled both to the housing main body 15A and to the cover 17. The circular tube body 49 is assembled such that the lower end portion 55 of the circular tube body 49 is placed on and fitted to the ditch 53 of the housing 15A. In the next place, the cover 17 is assembled to the housing 15A to enable the upper end portion 51 of the circular tube body 49 to be fitted to and disposed in the ditch 41 as illustrated in FIGS. 5 and 6.

The waterproof surface on the main body side 39A at the upper end portion 51 of the circular tube body 49 abuts on the waterproof surface on the cover side 43 to prevent water from entering the circuit-board arrangement portion 27. The upper end portion 51 of the circular tube body 49 is fitted to and disposed in the ditch 41 to surely prevent water from moving toward the circuit-board arrangement portion 27.

The lower end of the circular tube body 49 is placed and abuts on the ditch 53 to prevent water from moving from the ditch 53 to the outer peripheral side of the circular tube body 49 and to urge water to smoothly move toward the flange portion 25A, thereby draining off the water as is the case with the first embodiment.

The second embodiment can also serve the same waterproof function as the first embodiment.

In the second embodiment, such a simple construction that the circular tube body 49 is assembled enables achieving the same effect as the first embodiment.

Incidentally, the circular tube body 49 may be integrally molded in advance with the housing main body 15 at the time of resin molding thereof or with the cover 17 at the time of resin molding thereof.

What is claimed is:

1. A contactless rotation angle sensor comprising:
a detection shank which is provided with a magnetism generation body at its outer periphery, coupled to a rotating body to be detected and integrally rotates therewith; and
a housing which is formed of an insulating housing main body concentrically arranged around the detection shank and a cover for covering the upper portion of the housing main body and serves as a fixing side with a space left between the housing and detection shank; the contactless rotation angle sensor storing a circuit board at a circuit-board arrangement portion formed at the upper portion of the housing main body and covered with the cover and holding in the housing main body a detection body detecting a magnetism generation body in a contactless manner and outputting a detected signal to the circuit board, wherein a waterproof surface on the main body side positioned at the inner periphery of the circuit-board arrangement portion and rising toward the cover is circumferentially provided at the inner periphery of the housing main body, the waterproof surface on the main body side opposes the outer periphery of the detection shank through a space across from the upper to the lower portion of the housing main body, a waterproof surface on the cover side disposed opposite to the upper inner periphery of the waterproof surface on the main body side is circumferentially provided at the lower surface of the cover and a ditch passing between the upper and the lower portion of the housing is formed of the space between the detection shank and the housing and between the detection shank and the waterproof surface on the main body side.

2. The contactless rotation angle sensor according to claim 1, wherein a circulation port is provided between the detection shank and the housing main body and between the detection shank and the cover, the circulation port communicating with the ditch and being capable of circulating fluid from the outside of the housing.

3. The contactless rotation angle sensor according to claim 2, wherein the waterproof surface on the main body side is formed across a waterproof wall which integrally rises from the housing main body and the inner periphery of the housing main body.

4. The contactless rotation angle sensor according to claim 1, wherein the waterproof surface on the main body side is formed across a waterproof wall which integrally rises from the housing main body and the inner periphery of the housing main body.

5. The contactless rotation angle sensor according to claim 1, wherein the waterproof surface on the main body side is formed on the inner periphery of a circular tube body which is separately assembled both to the housing main body and to the cover and provided on the inner periphery of the housing main body across from the upper to the lower portion thereof.

* * * * *